United States Patent
Arai et al.

(10) Patent No.: US 7,999,517 B2
(45) Date of Patent: Aug. 16, 2011

(54) CHARGING CONTROL APPARATUS AND CHARGING APPARATUS

(75) Inventors: Nobuhiro Arai, Ashikaga (JP); Koichi Kuribara, Chiyoda-machi (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 69 days.

(21) Appl. No.: 12/497,466

(22) Filed: Jul. 2, 2009

(65) Prior Publication Data

US 2010/0001695 A1   Jan. 7, 2010

(30) Foreign Application Priority Data

Jul. 3, 2008   (JP) ................................ 2008-174694

(51) Int. Cl.
*H02J 7/04*   (2006.01)
*H04M 1/00*   (2006.01)
*H01H 47/00*   (2006.01)
*H01H 51/34*   (2006.01)

(52) U.S. Cl. ........ 320/162; 320/152; 320/157; 379/341; 379/336; 361/156; 361/157; 307/132 E

(58) Field of Classification Search .................... 320/162
See application file for complete search history.

(56) References Cited

U.S. PATENT DOCUMENTS

| | | | | | |
|---|---|---|---|---|---|
| 5,698,963 | A | * | 12/1997 | Seong et al. | 320/145 |
| 5,760,570 | A | * | 6/1998 | Nagai et al. | 320/162 |
| 5,986,437 | A | * | 11/1999 | Lee | 320/162 |
| 6,320,354 | B1 | * | 11/2001 | Sengupta et al. | 320/132 |
| 2004/0108834 | A1 | * | 6/2004 | Takano et al. | 320/120 |

FOREIGN PATENT DOCUMENTS

JP   2007-166825   6/2007

* cited by examiner

*Primary Examiner* — Edward Tso
*Assistant Examiner* — Yalkew Fantu
(74) *Attorney, Agent, or Firm* — SoCal IP Law Group LLP; Steven C. Sereboff; John E. Gunther

(57) ABSTRACT

A charging control apparatus comprising: a voltage control unit in a charging apparatus configured to control generation of an output voltage and a power supply voltage, the charging apparatus being an apparatus configured to generate, from a voltage of an input power supply applied through a relay, the output voltage for charging a battery and the power supply voltage for control; and a relay control unit operated by the power supply voltage, the relay control unit configured to drive the relay so as to stop applying the voltage of the input power supply to the charging apparatus, when detecting a standby state in which the battery is not being charged, and drive the relay so as to increase the power supply voltage by applying the voltage of the input power supply to the charging apparatus, when the power supply voltage decreases below a predetermined level.

7 Claims, 2 Drawing Sheets

CHARGING CONTROL APPARATUS AND CHARGING APPARATUS

CROSS-REFERENCE TO RELATED APPLICATION

This application claims the benefit of priority to Japanese Patent Application No. 2008-174694, filed Jul. 3, 2008, of which full contents are incorporated herein by reference.

BACKGROUND OF THE INVENTION

1. Field of the Invention

The present invention relates to a charging control apparatus and a charging apparatus.

2. Description of the Related Art

In a charging apparatus for charging a battery in an electronic apparatus such as a cellular telephone, a voltage of an AC power supply to be applied to the primary side is rectified to produce a direct-current voltage, and a transformer is driven by this direct-current voltage, so that an output voltage for charging the battery is generated on the secondary side (see Japanese Patent Laid-Open Publication 2007-166825, for example).

In order to reduce power consumption, such a charging apparatus may stop producing the output voltage when the completion of charging is detected and shift to a standby state, for example. However, even when the charging apparatus is in the standby state where the production of the output voltage is stopped, the voltage of the AC power supply is applied to the primary side of the circuit, and power continues to be consumed in a rectification circuit and the like.

SUMMARY OF THE INVENTION

A charging control apparatus according to an aspect of the present invention, comprises: a voltage control unit in a charging apparatus configured to control generation of an output voltage and a power supply voltage, the charging apparatus being an apparatus configured to generate, from a voltage of an input power supply applied through a relay, the output voltage for charging a battery and the power supply voltage for control; and a relay control unit operated by the power supply voltage, the relay control unit configured to drive the relay so as to stop applying the voltage of the input power supply to the charging apparatus, when detecting a standby state in which the battery is not being charged, and drive the relay so as to increase the power supply voltage by applying the voltage of the input power supply to the charging apparatus, when the power supply voltage decreases below a predetermined level.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
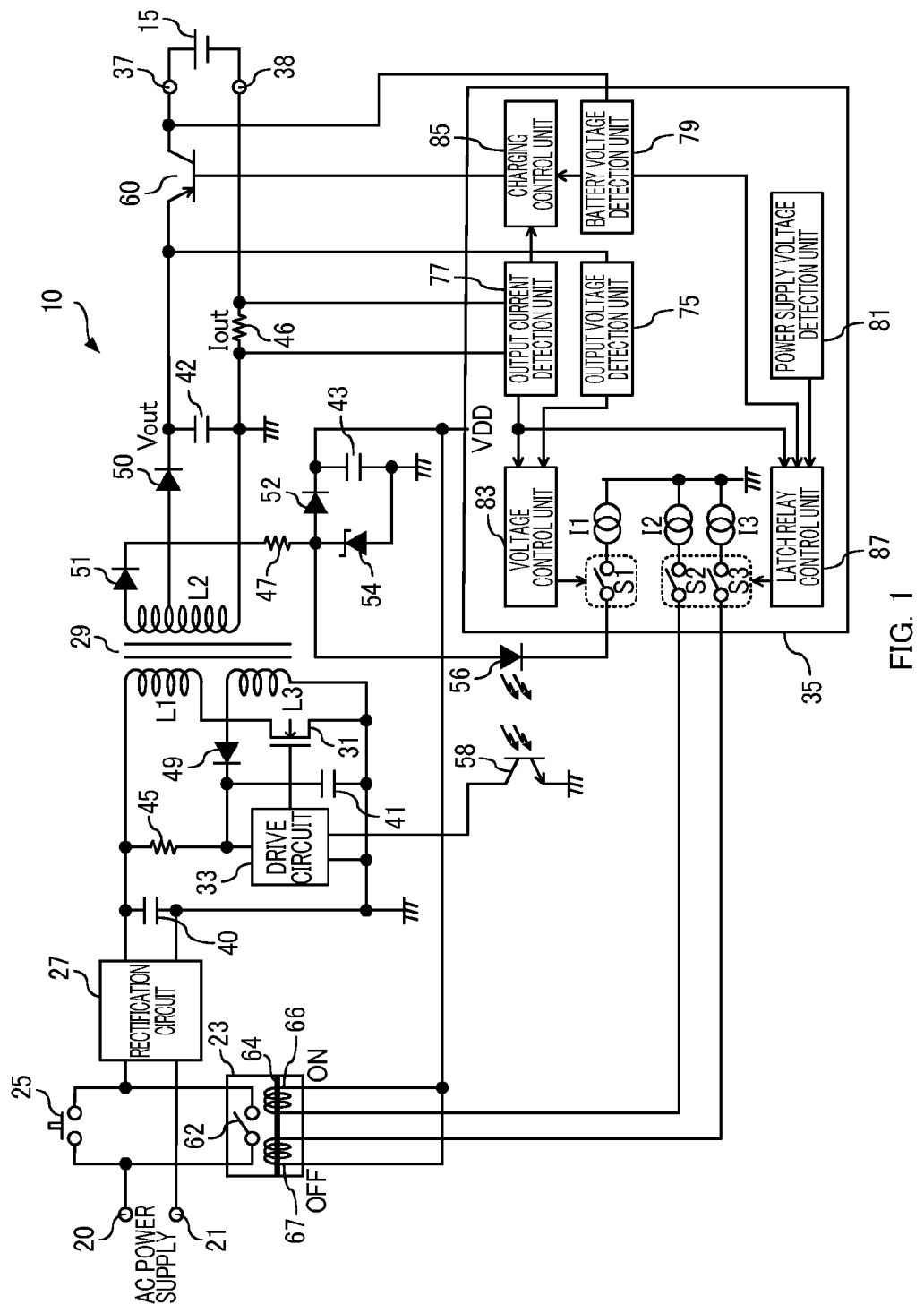
FIG. 1 is a diagram showing a configuration of a charging apparatus according to an embodiment of the present invention.

FIG. 1 is a diagram showing a configuration of a charging apparatus according to an embodiment of the present invention. The charging apparatus 10 is an apparatus to be used for charging a battery 15 in an electronic apparatus such as a cellular telephone. The charging apparatus 10 includes input terminals 20 and 21, a latch relay 23 of a latch type, for example, a push switch 25, a rectification circuit 27, a transformer 29, an N-channel MOSFET 31, a drive circuit 33, a control IC (integrated circuit) 35, output terminals 37 and 38, capacitors 40 to 43, resistors 45 to 47, diodes 49 to 52, a Zener diode 54, a light-emitting diode 56, a phototransistor 58 and a PNP transistor 60.

The latch relay 23 is a relay circuit that can maintain an ON/OFF state without current consumption. The latch relay 23 includes an iron piece 62, an iron core 64, and coils 66 and 67, for example. The iron piece 62 and the iron core 64 are formed of semi-hard magnetic material, for example, and the coils 66 and 67 are wound on the iron core 64 in directions opposite with each other. For example, a current is passed through the coil 66 to magnetize the iron core 64, and thus, the iron piece 62 is pulled toward the iron core 64 so that the switch is turned on. Even when a current stops being passed through the coil 66, an ON state is maintained due to the residual magnetic flux of the iron core 64. Thereafter, when a current is passed through the coil 67, the residual magnetic flux of the iron core 64 is reduced, and the iron piece 62 is moved off the iron core 64, so that the switch is turned off. Even when a current stops being passed through the coil 67, the OFF state is maintained. That is, the latch relay 23 temporarily needs power when the state of the switch is changed, however, after the state of the switch is changed, the state can be maintained without power consumption. Although, in an embodiment according to the present invention, a two-winding relay is used as the latch relay 23, a one-winding relay can be used in the same way.

The push switch 25 is a mechanically controlled switch that can apply to the rectification circuit 27 a voltage of an AC power supply input through the input terminals 20 and 21, even when the latch relay 23 is off. This push switch 25 is to be used once to turn on the latch relay 23 when the charging apparatus 10 is adjusted prior to shipment, and thus, it is not required to always mount the push switch 25. Although, the push switch 25 is used in an embodiment according to the present invention, a switch which is capable of applying the voltage of the AC power supply to the rectification circuit 27 by a mechanical operation such as a sliding switch or a rotary switch may be used instead of the push switch 25. When the latch relay 23 is used as a relay, a system can be configured that is able to automatically restart without pressing the push switch 25 even if no voltage of the AC power supply is applied for a long period of time. When a relay other than a latch-type relay is used as the relay, the push switch 25 serves as a start switch for a system.

The rectification circuit 27 rectifies the voltage of the AC power supply applied through the input terminals 20 and 21 to store direct-current voltage in the capacitor 40.

The transformer 29 includes a primary coil L1, a secondary coil L2 and an auxiliary coil L3; the primary coil L1 and the auxiliary coil L3 are isolated from the secondary coil L2. In the transformer 29, a current is generated in the secondary coil L2 and the auxiliary coil L3 according to change of a current through the primary coil L1.

The N-channel MOSFET 31 is a circuit that controls continuity of the primary coil L1. When the N-channel MOSFET 31 is turned on, the direct-current voltage stored in the capacitor 40 causes a current to pass through the primary coil L1, and when the N-channel MOSFET 31 is turned off, a current stops being passed through the primary coil L1.

The drive circuit 33 controls the N-channel MOSFET 31 as to ON/OFF based on a signal from the phototransistor 58. When the charging apparatus 10 is started, the drive circuit 33 is operated by a current (a starting current) that flows from the capacitor 40 through the resistor 45. Thereafter, when a switching operation of the N-channel MOSFET 31 is started, a current generated in the auxiliary coil L3 according to the continuity of the primary coil L1 is rectified by the diode 49, and the capacitor 41 is charged. Then, the drive circuit 33 is operated by the voltage stored in the capacitor 41.

The diode 50 rectifies a current flowing through the secondary coil L2 to be supplied to the capacitor 42. The capacitor 42 is charged with a current from the secondary coil L2, so that an output voltage Vout to be used for charging the battery 15 connected between the output terminals 37 and 38 is generated. The diodes 51 and 52 rectify a current flowing through the secondary coil L2 to be supplied to the capacitor 43. The capacitor 43 is charged with a current from the secondary coil L2, and thus, a power supply voltage VDD is generated that is used for driving the control IC 35. The Zener diode 54 is provided to clamp the power supply voltage V-DD at about 5V, for example.

That is, in the charging apparatus 10, a circuit including the rectification circuit 27, the transformer 29, the N-channel MOSFET 31, the capacitors 40 to 43 and the diodes 49 to 52 makes up a voltage generation circuit for generating the output voltage Vout and the power supply voltage VDD.

The light-emitting diode 56 converts an electrical signal into a light signal by control of the control IC 35, to be output. The phototransistor 58 converts a light signal from the light-emitting diode 56 into an electrical signal, to be output. That is, the light-emitting diode 56 and the phototransistor 58 make up a photocoupler.

The control IC 35 includes an output voltage detection unit 75, an output current detection unit 77, a battery voltage detection unit 79, a power supply voltage detection unit 81, a voltage control unit 83, a charging control unit 85, a latch relay control unit 87, constant current sources I1 to I3 and switches S1 to S3.

The output voltage detection unit 75 detects a level of the output voltage Vout. The output current detection unit 77 detects a level of an output current Iout for charging the battery 15, by a voltage across the resistor 46. The battery voltage detection unit 79 detects a level of the battery 15 connected between the terminals 37 and 38. The power supply voltage detection unit 81 detects a level of the power supply voltage VDD. The detection results obtained by the detection units 75, 77, 79 and 81 are, for example, converted by an A/D converter into digital values, to be output to the voltage control unit 83, the charging control unit 85 and the latch relay control unit 87.

The voltage control unit 83 controls the switch S1 based on the detection result obtained by the output voltage detection unit 75 and the output current detection unit 77, such that the output voltage Vout becomes constant and the output current Iout does not reach an overcurrent level. When the switch S1 is turned on, the light-emitting diode 56 is driven by the constant current source I1, so that a light signal is output. When the switch S1 is turned off, an output of a light signal is stopped. Then, a light signal corresponding to ON/OFF of the switch S1 is converted by the phototransistor 58 into an electrical signal, to be input to the drive circuit 33. The drive circuit 33 drives the N-channel MOSFET 31 according to a signal from the phototransistor 58 such that the output voltage Vout becomes constant and the output current Iout does not reach an overcurrent level.

When the charging control unit 85 detects that the battery 15 which has not been fully charged is connected between the output terminals 37 and 38, based on the detection results obtained by the battery voltage detection unit 79 and the output current detection unit 77, the charging control unit 85 turns on the PNP transistor 60 to start to charge the battery 15. Moreover, when the charging control unit 85 detects that the battery 15 has been fully charged based on the detection results obtained by the battery voltage detection unit 79 and the output current detection unit 77, the charging control unit 85 turns off the PNP transistor 60 to prevent overcharge of the battery 15.

The latch relay control unit 87 turns ON/OFF the switches S2 and S3 to drive the coils 66 and 67 by the constant current sources I2 and I3, so that the latch relay 23 is controlled as to ON/OFF. For example, when the latch relay control unit 87 detects a standby state in which the battery 15 is not being charged, the latch relay control unit 87 keeps the switch S3 ON for a predetermined time period to turn off the latch relay 23. Whether or not the state is in the standby state can be determined by, for example, a state of the charging control unit 85. Moreover, when the latch relay control unit 87 detects that the battery 15 has been fully charged based on the detection result obtained by the battery voltage detection unit 79, the latch relay control unit 87 keeps the switch S3 ON for a predetermined time period to turn off the latch relay 23. On the other hand, when the latch relay control unit 87 detects that the power supply voltage VDD decreases below a predetermined level (for example, 3V) based on the detection result obtained by the power supply voltage detection unit 81, the latch relay control unit 87 keeps the switch S2 ON for a predetermined period to turn on the latch relay 23. Furthermore, when the latch relay control unit 87 detects that the battery 15 which has not been fully charged is connected based on the detection result obtained by the battery voltage detection unit 79, the latch relay control unit 87 keeps the switch S2 ON for a predetermined period to turn on the latch relay 23.

The voltage control unit 83, the charging control unit 85 and the latch relay control unit 87 may be realized by software control with a microcomputer, etc., or by hardware.

Figure 2:
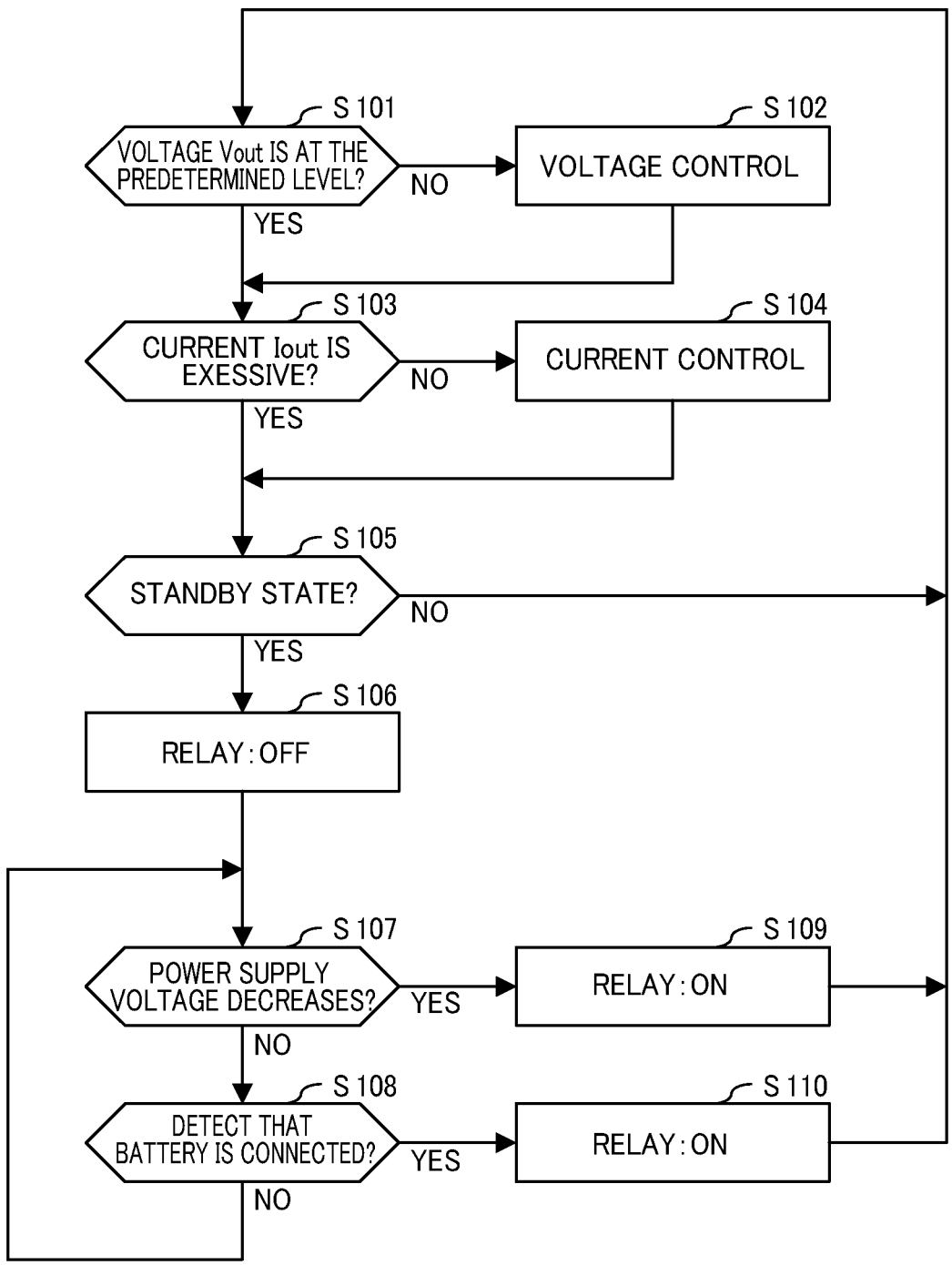
FIG. 2 is a flowchart showing an example of an operation of controlling a latch relay in an embodiment of the present invention.

FIG. 2 is a flowchart showing an example of a control operation of the latch relay 23. First, at a first startup of the charging apparatus 10, since a state of the latch relay 23 is unknown, the push switch 25 is turned on, so that the voltage of the AC power supply is applied through the input terminals 20 and 21. When the voltage of the AC power supply is applied, the drive circuit 33 starts to drive the N-channel MOSFET 31, so that generation of the output voltage Vout and the power supply voltage VDD is started. When an operation of the charging apparatus 10 is started, the latch relay control unit 87 detects that the battery 15 which has not been fully charged is connected, so as to control the switch S2 such that the latch relay 23 is turned on. Even when the battery 15 is not connected, if it is detected that the power supply voltage VDD is lower than a predetermined level, the latch relay control unit 87 controls the switch S2 such that the latch relay 23 is turned on. Thereafter, since the latch relay 23 is kept in an ON state, the push switch 25 can be turned off. Hereinafter, description will be made assuming that the push switch 25 is off.

When the battery 15 is started to be charged, the voltage control unit 83 monitors whether or not the output voltage Vout is at a predetermined level, and if it is not at the predetermined level (S101, No), the switch S1 is controlled such that the output voltage Vout is at the predetermined level (S102). Moreover, the voltage control unit 83 monitors whether or not the output current Iout reaches an overcurrent level, and if the output current Iout reaches the overcurrent level (S103, No), the switch S1 is controlled such that the output current Iout is reduced (S104).

The latch relay control unit 87 monitors whether or not the state is in the standby state (S105). If the state is not in the standby state (S105, No), the battery 15 is being charged, and thus, a processing of generating the output voltage Vout (S101 to S104) is repeatedly performed. Then, if the standby state is detected (S105, Yes), the latch relay control unit 87 controls the switch S3 such that the latch relay 23 is turned off (S106). In an embodiment according to the present invention, when the battery 15 is not connected or when the charging of the battery 15 is completed to turn off the PNP transistor 60, the state becomes in the standby state. In a configuration where the PNP transistor 60 is not provided, when it is detected that the battery 15 is fully charged, the latch relay control unit 87 may control the switch S3 such that the latch relay 23 is turned off.

When the latch relay 23 is turned off, application of the voltage of the AC power supply to the charging apparatus 10 is stopped. On the other hand, the control IC 35 continues operating with the power supply voltage VDD stored in the capacitor 43, and monitors decrease in the power supply voltage VDD (S107) and connection of the battery 15 (S108). Then, if it is detected that the power supply voltage VDD decreases to 3V, for example (S107, Yes), the latch relay control unit 87 controls the switch S2 such that the latch relay 23 is turned on (S109). When the latch relay 23 is turned on, such control is performed that the output voltage Vout becomes constant (S101 and S102), and accordingly, the capacitor 43 is charged so that the power supply voltage VDD increases. Thereafter, if the standby state is maintained (S105, Yes), the latch relay 23 is so controlled as to be turned off again (S106).

If, in the standby state, it is detected that the battery 15 is connected (S108, Yes), the latch relay control unit 87 controls the switch S2 such that the latch relay 23 is turned on (S110). When the latch relay 23 is turned on, the output voltage Vout is so controlled as to be constant (S101 and S102), and the PNP transistor 60 is turned on so that the charging of the battery 15 is started. Then, while the battery 15 is being charged, the state is not in the standby state (S105, No), so that the latch relay 23 is kept in the ON state, and thus, the controls of the output voltage Vout and the output current Iout are repeatedly performed (S101 to S104).

As above, the charging apparatus 10 according to an embodiment of the present invention is described. In the charging apparatus 10 according to an embodiment of the present invention, when the standby state in which the battery 15 is not being charged is detected, the latch relay 23 is so controlled as to be turned off. Then, after the latch relay 23 is turned off, the application of the voltage of the AC power supply to the charging apparatus 10 is stopped, and on the other hand, the control IC 35 continues operating with the power supply voltage VDD that is stored for backup in the capacitor 43. That is, it becomes possible to make power consumption zero in the standby state. Then, control is performed such that so as to turn on the latch relay 23, if the power supply voltage VDD decreases below a predetermined level in a state where the latch relay 23 is OFF. Thus, it is possible to prevent the latch relay 23 from being kept in the OFF state. For example, even if a power supply plug of the charging apparatus 10 is unplugged from an outlet when the latch relay 23 is OFF, control is performed so as to turn on the latch relay 23 when the power supply voltage VDD decreases, and thus, the latch relay 23 is prevented from being kept in the OFF state.

In the charging apparatus 10, when it is detected that the charging of the battery 15 has been completed, control can be performed so as to turn off the latch relay 23. Thus, it is possible to reduce unnecessary power consumption.

In the charging apparatus 10, even when the latch relay 23 is OFF, the control IC 35 continues operating with the power supply voltage VDD stored for backup in the capacitor 43, and if it is detected that the battery 15 is connected, the latch relay 23 is controlled to be turned on. Therefore, when the battery 15 is connected, the charging of the battery 15 can be automatically started without the need to operate the push switch 25 or the like.

Moreover, in the charging apparatus 10, since the push switch 25 is provided, even if a state of the latch relay 23 is unknown in an initial operation, the operation of the charging apparatus 10 can be started. If the charging apparatus 10 is shipped with the latch relay 23 being in the ON state, it is possible not to provide the push switch 25.

Moreover, in the charging apparatus 10, since the coils 66 and 67 of the latch relay 23 are driven by the constant current sources I2 and I3, it is possible to reliably control the latch relay 23, irrespective of change in the power supply voltage VDD.

In the charging apparatus 10, when the latch relay 23 is turned off, a current through a thermistor that detects a temperature may be stopped or an A/D converter that converts various detection values into digital values may be intermittently operated, for example. As a result of this, it is possible to slow down consumption of the power supply voltage VDD when the latch relay 23 is OFF, so that it becomes possible to prolong a period of time elapses before the latch relay 23 is turned on again.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A charging control apparatus for use in a charging apparatus for use in a charging apparatus, the charging apparatus configured to receive an input power supply voltage through a relay, and to generate both an output voltage for charging a battery and an internal power supply voltage (Vdd) for operating control circuits within the charging apparatus, the relay configured to control whether or not the charging apparatus receives the input power supply voltage, the charging control apparatus comprising:

a voltage control unit configured to control generation of the output voltage and the internal power supply voltage; and a relay control unit operated from the internal power supply voltage, the relay control unit configured to
drive the relay such that the charging apparatus does not receive the input power supply voltage when the relay control unit detects a standby state in which the battery is not being charged, and drive the relay such that to the charging apparatus receives the input power supply voltage when the internal power supply voltage decreases below a predetermined level.

2. The charging control apparatus of claim 1, wherein the relay control unit drives the relay such that the charging apparatus does not receive the input power supply voltage when the relay control unit detects that charging of the battery has been completed.

3. The charging control apparatus of claim 1, wherein the relay control unit drives the relay such that the charging apparatus receives the input power supply voltage when the relay control unit detects that a battery that is not fully charged is connected to an output terminal of the charging apparatus.

4. A charging apparatus comprising: a voltage generation circuit configured to receive an input voltage from an input power supply and to generate both an output voltage for charging a battery and an internal power supply voltage (Vdd) for operating control circuits within the charging apparatus;
   a relay connected between the input power supply and the voltage generation circuit, the relay configured to control whether or not the voltage generation circuit receives the input voltage from the input power supply; and
   a relay control unit operated from the internal power supply voltage, the relay control unit configured to
   drive the relay such that the voltage generation circuit does not receive the input voltage from the input power supply when the relay control unit detects a standby state in which the battery is not being charged, and
   drive the relay such that the voltage generation circuit receives the input voltage from the input power supply when the internal power supply voltage decreases below a predetermined level.

5. The charging apparatus of claim 4, further comprising: a switch capable of connecting the input voltage from the input power supply to the voltage generation circuit, irrespective of a state of the relay.

6. The charging control apparatus of claim 1, the relay control unit comprising: a power supply voltage detection unit to detect the internal power supply voltage decreases below the predetermined level.

7. The charging control apparatus of claim 1, further comprising: a capacitor that is charged to the internal power supply voltage while the relay is driven such that the charging apparatus receives the input power supply voltage, the capacitor storing the internal power supply voltage and providing the internal power supply voltage to the relay control circuit while the relay is driven such that the charging apparatus does not receive the input power supply voltage.

* * * * *

UNITED STATES PATENT AND TRADEMARK OFFICE
CERTIFICATE OF CORRECTION

PATENT NO. : 7,999,517 B2
APPLICATION NO. : 12/497466
DATED : August 16, 2011
INVENTOR(S) : Arai et al.

It is certified that error appears in the above-identified patent and that said Letters Patent is hereby corrected as shown below:

Column 6, line 48-49: delete "for use in a charging apparatus".

Column 7, line 1: delete "to".

Column 8, line 16: replace "detect the" with --detect when the--.

Signed and Sealed this
Eighteenth Day of October, 2011

David J. Kappos
*Director of the United States Patent and Trademark Office*